April 20, 1971 F. F. POLIZZANO 3,575,748
METHOD OF MAKING ELECTRICAL CABLE
Original Filed May 28, 1968
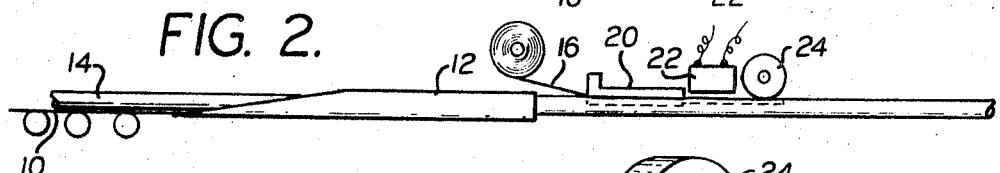
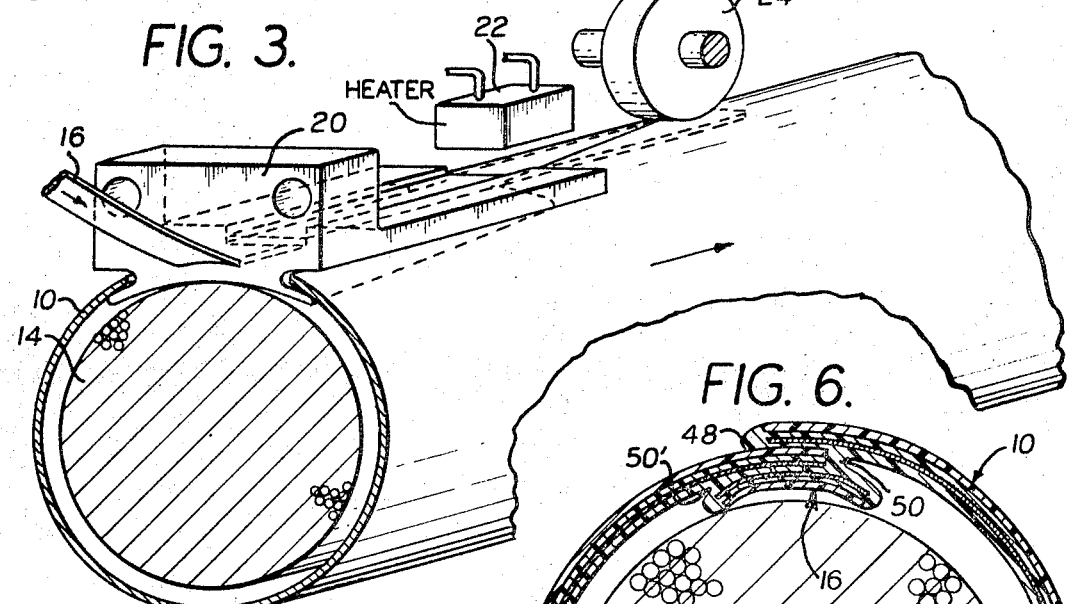
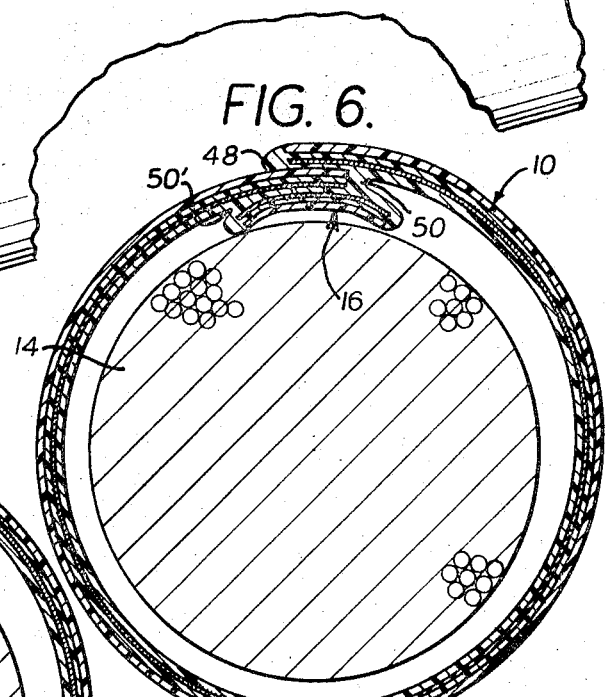
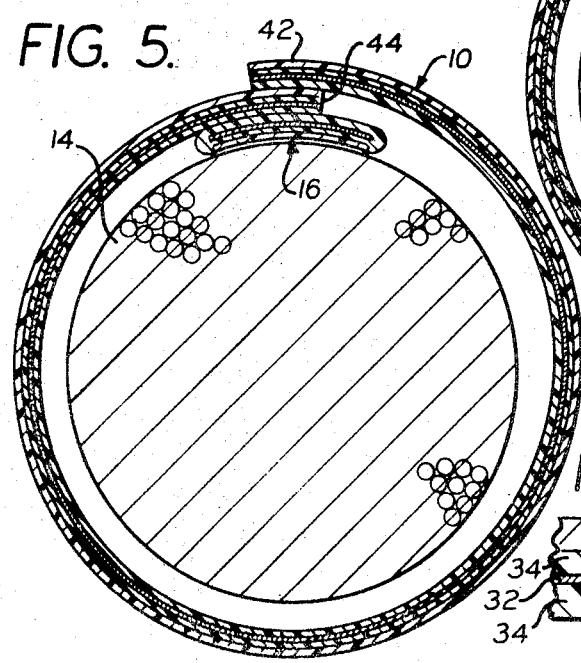
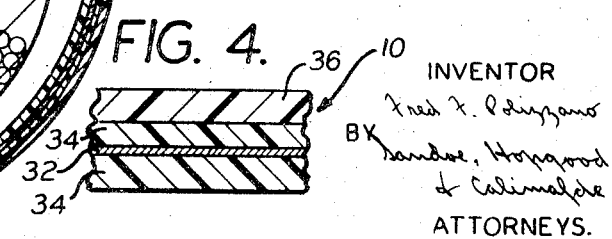

3,575,748
METHOD OF MAKING ELECTRICAL CABLE

Fred F. Polizzano, Allendale, N.J., assignor to General Cable Corporation, New York, N.Y.
Original application May 28, 1968, Ser. No. 732,755, now Patent No. 3,504,102, dated Mar. 31, 1970. Divided and this application Jan 28, 1970, Ser. No. 6,343
Int. Cl. H01b 13/00
U.S. Cl. 156—54     5 Claims

ABSTRACT OF THE DISCLOSURE

This improved method of making electrical cable has a cable jacket formed by a tape folded longitudinally around the core of the cable; and the tape is a lamination of a very thin strip of metal, such as aluminum or copper, which serves as a vapor barrier, with a coating on both sides of the metal of much greater thickness than the metal and bonded directly to the metal, preferably by a "chemical bond." A lap seam is preferably reinforced by a longitudinally extending plastic-metal laminate tape under the seam as a "bridging strip" with plastic coating and the confronting faces of the seam are heat-softened and pressed together to bond the edge portions of the seam together.

RELATED PATENTS AND APPLICATIONS

This application is a division of my copending patent application Ser. No. 732,755, filed May 28, 1968, and now Patent No. 3,504,102.

The tape used for making the jacket of this invention is plastic with a center lamination of metal which is very thin and used for the purpose of making the tape impervious to vapor, principally water vapor. Tape of the type used is disclosed in Jachimowicz Patent No. 3,206,541, issued Sept. 14, 1965. That patent discloses the forming of a seam with a radially extending tab along the seam, and the tab is bent over against the circumference of the jacket to complete the jacketing operation.

The making of electrical cable with a laminated jacket having a lap seam is disclosed in Garner Patent No. 3,332,138, issued July 25, 1965; but the Garner patent uses a different kind of tape which is a metal strip constituting most of the thickness of the tape, there being relatively thin laminations of plastic on the outside surface of the tape.

SUMMARY OF THE INVENTION

This invention provides an electric cable with a lap seam made with tape that is plastic except for the thin vapor barrier lamination of metal, such as aluminum or copper. The method used for the tape having the thicker metal lamination disclosed in Patent No. 3,223,036 is not suitable when the tape is essentially a plastic one with only a vapor barrier of metal. It is harder to fuse a lap seam with such a laminate because of the different effect of the heating.

The plastic is a poor conductor of heat, and the plastic coatings on the thicker metal laminate are thin and the underlying metal is a good conductor and serves as a heat sink for carrying away excess heat from the region of the seam. With the metal foil laminate tape of this invention, the plastic coatings are several times thicker than the metal and considerably thicker than the corresponding coatings on a tap that has a thicker metal laminate. The foil does not have enough cross section to carry away successive local heating; and the poor heat conductivity of the thicker plastic coatings makes the heating more critical because excess heating causes the plastic to flow away or to soften beyond the foil. It is important to avoid sticking of the outside plastic to the closing die and to the protecting jacket that is extruded over the sheath.

With the metal foil laminate tapes, there are advantages in having the plastic coating, on at least the outside of the jacket, in two layers, and with the outer layer or lamination of plastic of a higher fusing temperature than the inner layer.

Another expedient used with this invention is a bridging or reinforcing tape that spans the lapseam on the inside. When tape is used which has an outer lamination with a higher temperature fusion point, the bridging or reinforcing tape is turned inside out, as compared with the tape that forms the lap seam of the sheath, so that the lower melting point plastic of the bridging or reinforcing tape confronts the lower melting point plastic on the inside of the other tape which forms the sheath.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:

FIG. 1 is a diagrammatic top plan view of apparatus for making electrical cable in accordance with this invention;

FIG. 2 is a diagrammatic side elevation of the apparatus shown in FIG. 1;

FIG. 3 is a greatly enlarged, isometric detail view of a part of the apparatus shown in FIGS. 1 and 2;

FIG. 4 is a greatly enlarged fragmentary sectional view through the tape used in FIGS. 1 through 3;

FIG. 5 is an enlarged sectional view showing the tapes and cable core in assembled relation prior to fusing of the plastic coatings; and FIG. 6 is a view similar to FIG. 5 but and showing the seam after the plastic coatings have been fused.

DESCRIPTION OF THE PREFERRED EMBODIMENT

FIG. 1 shows a tape 10 which is advanced through a forming guide 12 which bends the tape longitudinally into a tube with a lap seam. An electrical conductor core 14 is advanced with the tape so that the tape forms around and encloses the core. A second tape 16, substantially narrower than the tape 10, is also advanced into the forming guide 12 with the tape 10 and the core 14. This tape 16 will be referred to herein as a bridging or reinforcing tape, the function of which will be explained in connection with other views of the drawing. The tape 10 forms a sheath around the core 14 and the lap seam formed is one in which one edge portion of the tape 10 overlaps the other edge portion in such a way that the inside of the first edge portion confronts the outside surface of the other edge portion. Thus the sheath is substantially circular in cross section and does not have the usual upstanding tab which has been conventional in the prior art.

At the end of the forming guide 12, there is a sealing shoe 20 which guides the edge portions of the tape 10 in its final forming operation. A heater 22 is carried by the sealing shoe 20 and the heater 22 is preferably an inductor. Other kinds of heaters can be used, but it is important that the heater effect a rapid rise in temperature along the localized regions where the plastic coatings on the tapes are to be fused and without permitting time for the heat to travel down into the cable core.

Immediately beyond the heater 22, a sealing roll 24 contacts with the seam through an opening in the top of the shoe 20. Other means can be used for applying sealing pressure to the seam, but the roll 24 has the advantage that the surface in contact with the heated sheath is constantly changing so that the roll carries heat away from the seam and promotes more rapid cooling. If desired, the roll 24 can be artificially cooled.

FIG. 4 is an enlarged sectional view through the tape 10. The tape 16 can have the same construction. In the illustrated tape there is a metal foil laminate 32 with plastic coating 34 on both its upper and lower surface. The metal foil 32 is preferably aluminum or copper of a thickness less than about one mil. Aluminum foil of .7 mil has been used effectively. The plastic coatings 34 are preferably polyethylene of a thickness between about 4 to 10 mils. It is advantageous to use a low density copolymer of polyethylene modified with monomers containing reactive carboxyl groups. Such a copolymer obtains an extremely effective bond to the metal foil and may be said to be "chemically bonded" to the metal. In practice, a thickness of 4 or 5 mils has been used effectively for the coatings 34.

The tape 10 can be made with only the thin lamination 32 and the two coatings 34; but there are advantages in having a fourth lamination or outer coating 36 over the upper coating 34 as this outer coating is a plastic with a higher softening point than the underlying coating 34. For example: the coating 34 can be a low density polyethylene and the coating 36 a high density polyethylene with resulting higher softening or melting temperature. The outer coating or laminate 36 can be from 4 to 10 mils in thickness, but where two laminations are used on one side of the foil 32, as illustrated in FIG. 4, the coating 34, which is under the outer coating 36, can be slightly thinner than the coating 34 on the under side of the foil; for example: a coating 34 of 4 mils and a coating 36 of 5 mils can be used. These values are given by way of illustration.

FIG. 5 shows the tape 10 formed into a tube around the core 14 and with one edge portion 42 of the tape overlying the opposite edge portion 44. The bridging or reinforcing tape 16 is located under the lap seam formed by the edge portions 42 and 44. This reinforcing tape 16 is located under the lap seam formed by the edge portions 42 and 44. This reinforcing tape 16 is preferably wider than the lap of the edge portions 42 and 44 and it extends beyond the edge portion 44 so as to bond to part of the area of the edge portion 42 which extends beyond the edge portion 44, as will be explained on connection with FIG. 6.

The tape 16 is shown with the same construction as the tape 10 and the corresponding laminations are indicated by the same reference characters as in FIG. 4 with a prime appended. It is one feature of the invention that when a reinforcing tape is used, which has a higher density coating on one side than the other, the side with the lower density coating exposed confronts the inside of the tubular sheath formed by the tape 10. Since the tape 10 is formed with the lower density coating on the inside, this brings together confronting faces of the tape 10 and tape 16 which fuse at the lowest temperatures, and it is not necessary to raise the top or outer face of the tape 16 to as high a temperature as the outer face of the edge portion 44 which is nearer to the source of heat.

FIG. 6 shows the seam after the confronting faces of the seam have been raised to fusion temperature and pressed into contact with one another. The outer surface 36 of the inner edge portion 44 is raised to a fusion temperature but does not soften to the same extent as the inner plastic coating of the edge portion 42. Thus some of the plastic on the inside of the edge portion 42 is squeezed out of the seam to form a bead 48 which covers the exposed edge of the metal foil, if that edge is exposed in the tape 10 as originally supplied. The bead 48 also strengthens the bond and gives the seam a smoother finish. On the inside of the edge portion 44, plastic is squeezed out to form a fillet 50 which connects a portion of the tape 16 to the inside of the tape 10 beyond the end of the edge portion 44. A similar fillet 50' forms along the other edge of the tape 16 but the distance here between the metal foils is less and the fillet is less pronounced. It should be noted, however, that while the seam shown in FIG. 5, before fusion, has a thickness equal to three times the thickness of the tapes, the thickness of the finished seam, shown in FIG. 6, is considerably reduced as a result of the squeezing out of the the low density plastic when the confronting faces of the tapes are pressed together.

The plastic coatings on the tapes are heated sufficiently to cause them to bond together and the lower density coatings are heated sufficiently to cause them to flow. The expressions "fusion" or "fusion temperature" are used herein to indicate temperatures at which the plastics will bond together when brought in contact with one another. This is a temperature of softening or incipient fusion and may be somewhat less than the actual "melting" temperature of the plastic.

The sheath is formed around the core 14 with some clearance so that the core can move with respect to the sheath for greater flexibility of the cable; but the clearance shown in FIGS. 5 and 6 is purposely exaggerated for clearer illustration.

After the seam of the sheath has been "welded" or bonded together as described, an outer protecting jacket is usually extruded over the sheath as a continuous operation with the forming and sealing of the sheath. An important advantage of the outer laminate of higher density plastic permits the protecting jacket to be extruded at higher temperature without risk of having the plastic of the sheath fuse to the extruded plastic of the jacket. Such a fusing of the protecting jacket to the sheath has two disadvantages. It reduces the flexibility of the cable and it makes difficult the stripping of the outer jacket for connections without risk of damage to the coating on the metal foil.

The preferred embodiment of the invention has been illustrated and described, but changes and modifications can be made and some features can be used in different combinations without departing from the invention as defined in the claims.

What is claimed is:

1. The method of sheating and jacketing an electrical cable core in a tube made of a tape of metal foil coated on both sides by plastic, the plastic on each side of the metal being a number of times thicker than the metal, which method comprises advancing the core in the direction of its length, advancing the tape with the core, bending the tape longitudinally and progressively around the core to form a lap seam tube with the inside of one edge portion of the tape overlying the outside of the other edge portion, feeding a plastic-faced reinforcing strip into the tube as it forms and with said reinforcing strip located between the core and the lap seam and with the plastic face of the reinforcing strip in contact with the inside of the tube under the lap seam, heating the plastic face of the reinforcing strip and a face on the inside of the tube that confronts said plastic face of the reinforcing strip, maintaining the heat until the confronting faces reach a fusion temperature, and bonding the confronting faces together by pressing them into contact with one another while at fusion temperature.

2. The method described in claim 1 characterized by the edge portion of the tape that overlies the other edge portion of the tape having confronting faces, heating these confronting faces to a fusing temperature at the same time with the confronting faces of the reinforcing strip and the inside of the tube and heating and bringing all of the confronting faces into contact at substantially the same time.

3. The method described in claim 2 characterized by heating the plastic surfaces of the tube and the reinforcing strip to soften the plastic to a flowable temperature and displacing plastic from the confronting faces around the edges of the metal foil to cover said edges and to protect them from corrosion.

4. The method described in claim 1 characterized by forming the sheath with a tape that has two laminations on one side including a lower fusion temperature laminate on the foil and a higher fusion temperature laminate overlying the lower fusion temperature laminate, feeding a similar but narrower tape into the sheath under the lap seam, bending the wider tape into a tube with the higher fusion temperature laminate on the outside, and feeding the narrower tape into the sheath with the higher fusion temperature laminate on the inside whereby faces of the tapes remote from the high fusion temperature laminates confront one another for fusing the narrower tape to the inside of the sheath.

5. The method described in claim 1 characterized by feeding into the sheath as the reinforcing strip a tape that has a width less than about one-fourth in width of the tape that is folded to make the sheath, and locating the reinforcing strip under the lap seam in contact with the edge portion which is on the inside of the lap and extending beyond that edge portion into contact with the inside of the outer edge portion where said outer edge portion extends beyond the termination of the inner edge portion, and fusing the reinforcing strip to both of said edge portions where it contacts with them.

References Cited

UNITED STATES PATENTS

| | | | |
|---|---|---|---|
| 3,087,007 | 4/1963 | Jachimowicz | 174—110 |
| 3,233,036 | 2/1966 | Jachimowicz | 174—107 |
| 3,332,138 | 7/1967 | Garner | 156—54(UX) |

SAMUEL FEINBERG, Primary Examiner

H. J. TUDOR, Assistant Examiner

U.S. Cl. X.R.

156—55; 174—107, 110